US008424705B2

(12) United States Patent
Palmer et al.

(10) Patent No.: US 8,424,705 B2
(45) Date of Patent: Apr. 23, 2013

(54) GAGE COVER RETENTION MECHANISM

(75) Inventors: Brian Lee Palmer, Michigan City, IN (US); Michael A. Popp, LaPorte, IN (US)

(73) Assignee: Dwyer Instruments, Inc., Michigan, IN (US)

( * ) Notice: Subject to any disclaimer, the term of this patent is extended or adjusted under 35 U.S.C. 154(b) by 728 days.

(21) Appl. No.: 12/551,940

(22) Filed: Sep. 1, 2009

(65) Prior Publication Data

US 2009/0320590 A1 Dec. 31, 2009

Related U.S. Application Data

(63) Continuation-in-part of application No. 11/851,515, filed on Sep. 7, 2007, now Pat. No. 7,600,427.

(51) Int. Cl.
*B65D 41/06* (2006.01)

(52) U.S. Cl.
USPC ........... 220/302; 220/301; 220/293; 220/300; 220/664

(58) Field of Classification Search ................... 220/664, 220/DIG. 32, DIG. 33, 727, 298, 301, 297, 220/293, 661, 302, 300
See application file for complete search history.

(56) References Cited

U.S. PATENT DOCUMENTS

| | | | |
|---|---|---|---|
| 1,750,601 A | 3/1930 | Keeney | |
| 1,919,213 A | 7/1933 | Emens | |
| 2,005,792 A | 6/1935 | Leins | |
| 2,402,360 A | 6/1946 | Bevins | |
| 2,745,275 A | 5/1956 | Jacobi | |
| 2,895,637 A | 7/1959 | Bakke et al. | |
| 2,906,863 A | 9/1959 | Ritter | |
| 3,001,668 A | 9/1961 | Charbonneaux et al. | |
| 3,166,941 A | 1/1965 | Waite et al. | |
| 3,439,543 A | 4/1969 | Aldeborgh | |
| 3,445,022 A * | 5/1969 | Cilluffo | 215/216 |
| 3,510,196 A | 5/1970 | Beer et al. | |
| 3,628,096 A | 12/1971 | Drew et al. | |
| 3,744,748 A | 7/1973 | Harrold | |
| 3,830,391 A * | 8/1974 | Uhlig | 215/216 |
| 3,831,797 A * | 8/1974 | Stevens, Jr. | 215/216 |
| 3,894,647 A * | 7/1975 | Van Montgomery | 215/216 |
| 3,895,730 A * | 7/1975 | Koehne et al. | 215/216 |
| 3,943,441 A | 3/1976 | Shackford | |
| 4,053,082 A | 10/1977 | Ullman | |
| 4,081,102 A | 3/1978 | Sakai | |
| 4,235,186 A | 11/1980 | Frobose | |
| 4,279,355 A | 7/1981 | Schwartz et al. | |

(Continued)

FOREIGN PATENT DOCUMENTS

EP   0 683 108 A2   11/1995

*Primary Examiner* — Anthony Stashick
*Assistant Examiner* — Christopher McKinley
(74) *Attorney, Agent, or Firm* — Barnes & Thornburg LLP (57) ABSTRACT

A cover retention mechanism for releasably locking a cover to a base such as a gage housing. The cover retention mechanism includes a base lock having a receiver and a receptacle, and a cover lock having a latch attached to an end of a flexible arm. The latch is selectively movable between a retracted position wherein the latch engages the receptacle to prevent rotational movement of the cover with respect to the housing from the closed position toward an open position, and an extended position wherein the latch is removed from the receptacle and the cover is rotatable with respect to the housing from the closed position toward the open position.

19 Claims, 7 Drawing Sheets

U.S. PATENT DOCUMENTS

| | | | | |
|---|---|---|---|---|
| 4,331,247 A | * | 5/1982 | Mumford | 215/216 |
| 4,333,580 A | * | 6/1982 | Sweigart, Jr. | 220/4.13 |
| 4,456,136 A | * | 6/1984 | Palsson | 215/216 |
| 4,540,098 A | * | 9/1985 | Luker | 215/216 |
| 4,676,390 A | | 6/1987 | Harris | |
| 4,749,093 A | | 6/1988 | Trick | |
| 4,811,600 A | | 3/1989 | Robitaille | |
| 5,040,692 A | * | 8/1991 | Julian | 215/252 |
| 5,213,224 A | * | 5/1993 | Luch | 215/256 |
| 5,225,165 A | * | 7/1993 | Perlman | 422/548 |
| 5,462,182 A | * | 10/1995 | Opresco | 215/216 |
| 5,567,883 A | | 10/1996 | Nara | |
| 5,636,758 A | | 6/1997 | Su | |
| 5,676,273 A | * | 10/1997 | Jonkers et al. | 220/293 |
| 5,722,546 A | * | 3/1998 | Briere | 215/216 |
| 5,915,056 A | | 6/1999 | Bradley et al. | |
| 5,954,044 A | | 9/1999 | Schmidt et al. | |
| 6,036,036 A | * | 3/2000 | Bilani et al. | 215/216 |
| 6,053,043 A | | 4/2000 | Dannenberg et al. | |
| 6,076,689 A | * | 6/2000 | Vassallo | 215/209 |
| 6,094,983 A | | 8/2000 | Pearl | |
| 6,109,467 A | | 8/2000 | Schliemann et al. | |
| 6,279,766 B1 | * | 8/2001 | Jones et al. | 215/219 |
| 6,296,130 B1 | * | 10/2001 | Forsyth et al. | 215/219 |
| 6,318,173 B1 | | 11/2001 | Pearl | |
| 6,318,683 B1 | | 11/2001 | Savoy | |
| 6,402,798 B1 | * | 6/2002 | Kallsen et al. | 55/385.3 |
| 6,436,162 B1 | * | 8/2002 | Wake et al. | 55/498 |
| 6,508,192 B2 | | 1/2003 | Lentine | |
| 6,871,752 B2 | * | 3/2005 | Montgomery | 215/219 |
| 7,017,782 B2 | | 3/2006 | Harrold | |
| 7,387,214 B1 | * | 6/2008 | Shingle | 215/222 |
| 7,581,652 B2 | * | 9/2009 | Flak et al. | 215/252 |
| 7,850,756 B1 | * | 12/2010 | Senetar, III | 55/503 |
| 2004/0079765 A1 | | 4/2004 | Gallo et al. | |
| 2005/0252878 A1 | * | 11/2005 | Babcock | 215/252 |
| 2008/0110906 A1 | | 5/2008 | Thompson | |

* cited by examiner

GAGE COVER RETENTION MECHANISM

CROSS REFERENCE TO RELATED APPLICATIONS

This application is a Continuation-in-Part of co-pending application Ser. No. 11/851,515, filed Sep. 7, 2007.

BACKGROUND

The present disclosure is directed to a cover retention mechanism for releasably locking a cover to a base, and in particular to a cover retention mechanism for releasably locking a cover of a gage enclosure to a housing of the enclosure.

Gages, for example, pressure gages and temperature gages, often include an enclosure that contains the operating mechanism of the gage. Gage enclosures often include a housing that is adapted to be mounted to a panel and a cover that is removably coupled to the housing. It is desirable to be able to remove the cover from the housing to enable the inspection, adjustment, maintenance or replacement of the gage operating mechanism. However, it is also desirable to selectively lock the cover to the housing to prevent unintentional or inadvertent removal of the cover from the housing.

SUMMARY

A cover retention mechanism comprising a base and a cover adapted to be removably coupled to the base. The base includes a rim, a central axis and a base lock having a receptacle. The receptacle includes a stop member. The cover includes a cover lock having a resiliently flexible locking member with a first end and a second end. The first end of the locking member is manually movable with respect to the second end of the locking member. The first end of the locking member includes a latch adapted to be located in the receptacle of the base lock when the cover is coupled to the base and the cover is located in a closed position with respect to the base such that the cover cannot be removed from the base by movement of the cover with respect to the base solely along the central axis. The cover is selectively movable from the closed position to an open position, wherein the cover can be removed from the base by movement of the cover with respect to the base along the central axis, by rotating the cover with respect to the base about the central axis.

When the latch of the locking member is located in the receptacle, the latch is adapted to engage the stop member of the base lock to prevent rotation of the cover with respect to the base about the central axis from the closed position to the open position. The latch can be manually removed from the receptacle of the base lock, whereupon the cover can be rotated with respect to the base about the central axis from the closed position to the open position.

DETAILED DESCRIPTION OF THE PREFERRED EMBODIMENTS

Figure 1:
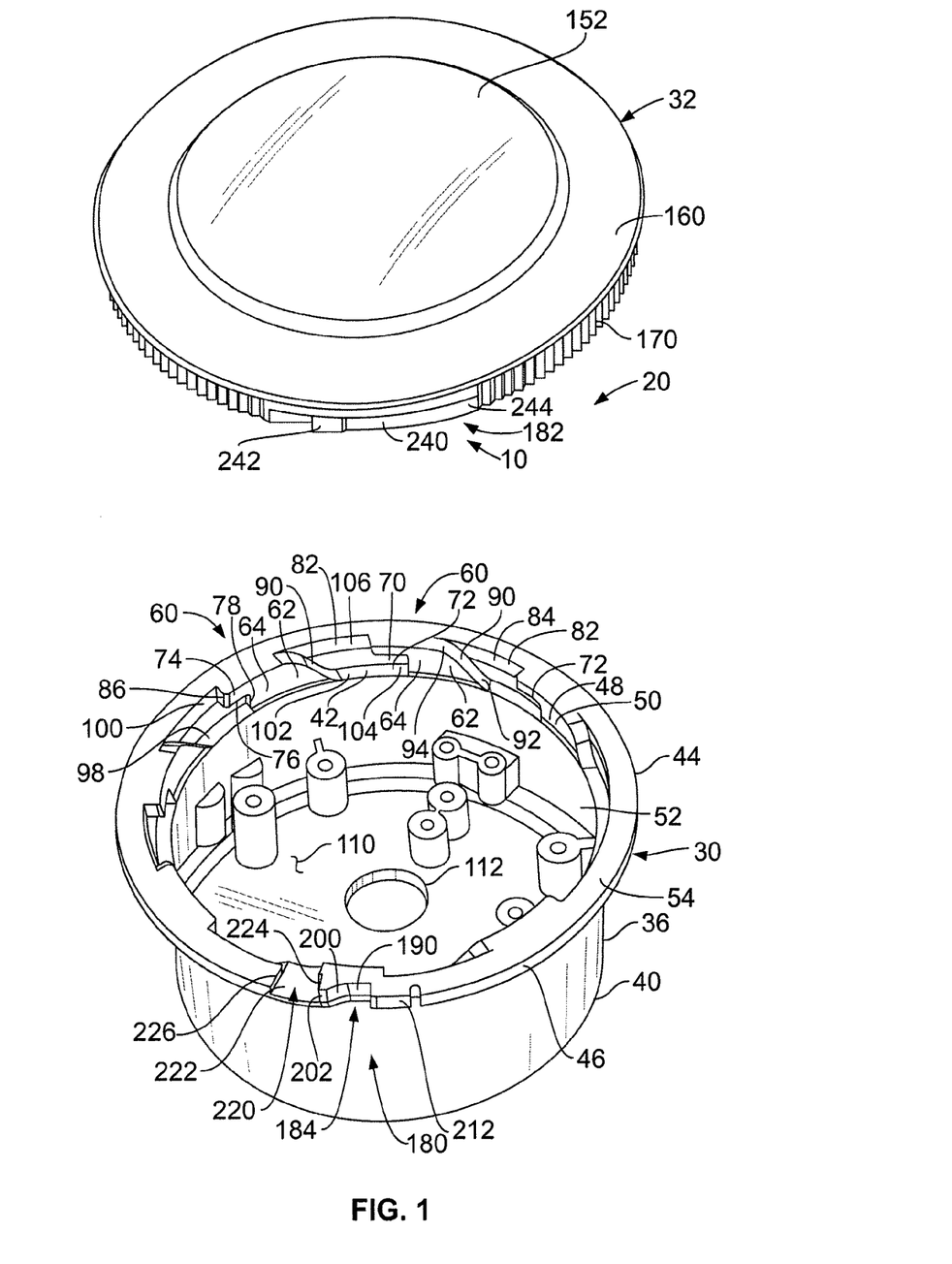
FIG. 1 is an exploded perspective view of a gage enclosure having a gage housing, a gage cover and a gage cover retention mechanism for selectively locking the gage cover to the gage housing.

A gage cover retention mechanism 10 is shown in FIG. 1 embodied in an enclosure 20 for a gage. The enclosure 20 is adapted to receive and contain the operating mechanism of a gage, such as for example, a pressure gage, temperature gage or other indicating gage. The enclosure 20 includes a base, such as a housing 30, and a cover 32. The cover 32 is adapted to be releasably coupled to the housing 30 and the cover retention mechanism 10 is configured to releasably lock the cover 32 to the housing 30. The housing 30 includes a generally linear central longitudinal axis 34 and a generally circular and cylindrical peripheral side wall 36 that extends concentrically about the central axis 34. The side wall 36 extends between a first end 38 and a second end 40. The side wall 36 includes a generally circular peripheral edge 42 at the first end 38. A generally circular and annular rim 44 is attached to the edge 42 and first end 38 of the side wall 36. The rim 44 extends generally concentrically about the central axis 34. The rim 44 includes a generally circular outer edge 46 and a generally circular inner edge 48, each of which are generally concentric about the central axis 34. An opening 50 is formed by the inner edge 48 of the rim 44 that is in communication with a chamber 52 formed within the housing 30 by the side wall 36. The rim 44 includes a generally planar outer surface 54 and a spaced apart and generally parallel planar inner surface 56.

The rim 44 is attached to the edge 42 at the first end 38 of the side wall 36 by one or more mounting mechanisms 60. Each mounting mechanism 60 includes a first post 62 and a second post 64. Each post 62 and 64 extends from the edge 42 at the first end 38 of the side wall 36 to the inner surface 56 of the rim 44. The first post 62 of each mounting mechanism may be attached to and formed integrally with the second post 64 of an adjacent mounting mechanism 60. The mounting mechanisms 60 are spaced apart from one another along the perimeter of the side wall 36 generally equidistantly and uniformly about the central axis 34. Each mounting mechanism 60 includes an elongate radial slot 70 that extends along the side wall 36 between a first post 62 and second post 64. The radial slot 70 forms a bottom surface 72 that is generally planar and that extends along the first end 38 of the side wall 36. The bottom surface 72 of the radial slot 70 may be formed as part of the edge 42 of the side wall 36. The radial slot 70 also forms an overhang 74 in the second post 64 having an engagement surface 76 that is generally parallel to and spaced apart from the bottom surface 72. The radial slot 70 also forms an end wall 78 at the second post 64 that extends generally perpendicularly between the bottom surface 72 and engagement surface 76. If desired, the radial slot 70 may extend radially outwardly from the central axis 34 through the housing 30.

Each mounting mechanism 60 also includes a longitudinal slot 82 that extends between the first post 62 and the second post 64. The longitudinal slot 82 also extends inwardly from the outer surface 54 of the rim 44 toward the side wall 36 and is in communication with the radial slot 70. The longitudinal slot 82 forms a side wall 84 that extends from the overhang 74 of the second post 64 to the first post 62. The side wall 84 extends from the inner surface 56 to the outer surface 54 of the rim 44. The side wall 84 is generally parallel to the outer edge 46 of the rim 44. The longitudinal slot 82 also forms an end wall 86 that extends from the side wall 84 to the inner edge 48 of the rim 44. The end wall 86 forms an outer end of the overhang 74.

Each mounting mechanism 60 also includes a cover removal mechanism such as an inclined ramp 90. The ramp 90 includes a first end 92 located adjacent the bottom surface 72 and a second end 94 located adjacent the outer surface 54 of the rim 44. The ramp 90 includes a surface that extends from the first end 92 to the second end 94 and that may be inclined with respect to the bottom surface 72 at an angle of approximately forty-five degrees, although other angles of inclination may be used. The first end 92 of the ramp 90 may include a generally concavely curved surface portion that extends outwardly from the bottom surface 72 toward the second end 94. The second end 94 of the ramp 90 may include a generally convexly curved surface portion that extends inwardly from the outer surface 54 of the rim 44 toward the first end 92. If desired, the ramp 90 need not extend all the way to the outer surface 54 of the rim 44, and the second end 94 of the ramp 90 may be located adjacent to but spaced apart from the outer surface 54 of the rim 44.

The longitudinal slot 82 includes a first end 98 located adjacent the second end 94 of the ramp 90 and a second end 100 located adjacent the end wall 86 of the overhang 74. The radial slot 70 includes a first end 102 located adjacent the first end 92 of the ramp 90 and a second end 104 located adjacent the second post 64. The end wall 86 of the overhang 74 is spaced apart from the first end 92 of the ramp 90 such that the second end 100 of the longitudinal slot 82 is located in longitudinal alignment with the radial slot 70 and the bottom surface 72. A passageway 106 is thereby formed generally parallel to the central axis 34 that extends from the bottom surface 76 to the opening formed in the outer surface 54 of the rim 44 by the longitudinal slot 82.

The housing 30 also includes an end wall 110. The end wall 110 is attached to and along the second end 40 of the side wall 36 and is generally perpendicular to the side wall 36 and central axis 34. The end wall 110 includes a central aperture 112 in communication with the chamber 52 that is located concentrically about the central axis 34. The housing 30 may be integrally formed from a plastic material. The chamber 52 is adapted to receive the operating mechanism of a gage.

Figure 6:
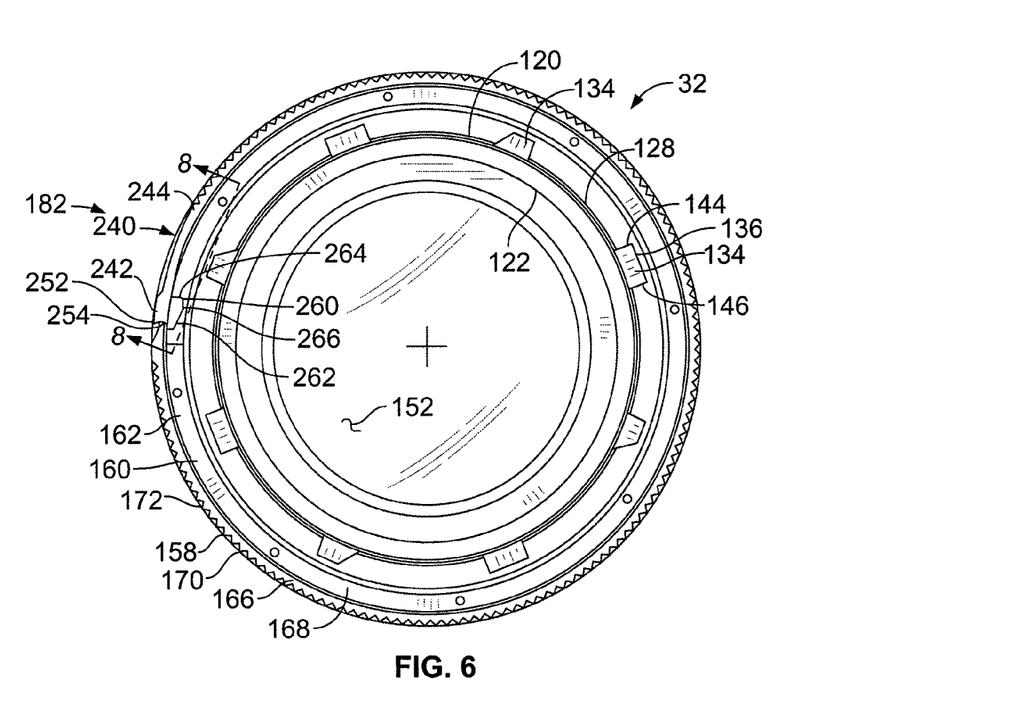
FIG. 6 is a bottom view of the gage cover showing the cover lock of the cover retention mechanism.
Figure 7:
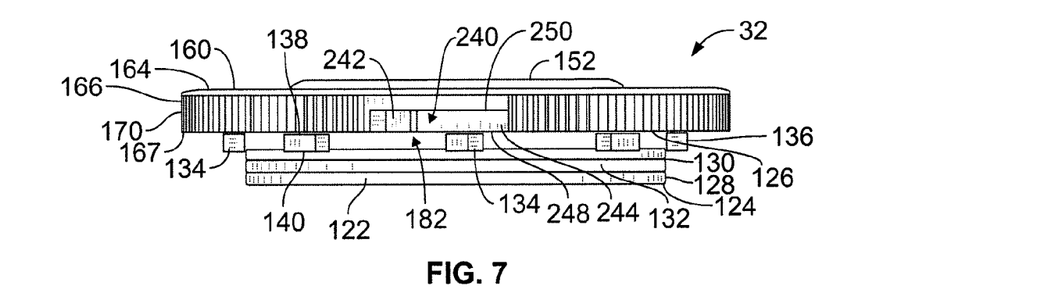
FIG. 7 is a side elevation view of the gage cover.
Figure 8:
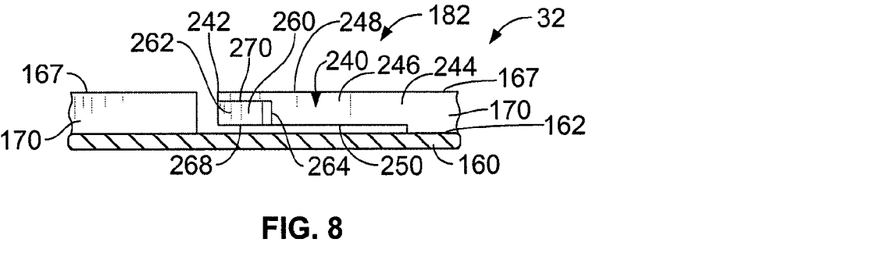
FIG. 8 is a cross sectional view of the gage cover taken along line 8-8 of FIG. 6 showing the cover lock of the cover retention mechanism.

The cover 32, as shown in FIGS. 6-8, includes a generally cylindrical mounting member 120. The mounting member 120 includes a generally circular and cylindrical side wall 122. The side wall 122 extends from a first end 124 to a second end 126 and includes an outer surface 128. A circumferential groove 130 is located in the outer surface 128 of the side wall 122 and extends around the side wall 122. A resilient elastomeric seal member 132, such as for example, an O-ring, is located within the groove 130 and extends around the side wall 122 and outwardly beyond the outer surface 128 of the side wall 122. The mounting member 120 also includes one or more mounting lugs 134, and may include one mounting lug 134 for each mounting mechanism 60 of the housing 30. The mounting member 120 may include fewer mounting lugs 134 than the number of mounting mechanisms 60 included in the housing 30, if desired. Each mounting lug 134 extends outwardly from the outer surface 128 of the side wall 122 to an outer end 136. Each mounting lug 134 also includes a generally planar top surface 138 and a generally planar bottom surface 140 that is generally parallel to the top surface 138. Each mounting lug 134 also includes a first side wall 144 and a spaced apart second side wall 146 that extend outwardly from the outer surface 128 of the side wall 122 to the outer end 136 of the mounting lug 134. The first side wall 144 and/or the second side wall 146 may be generally parallel to a radius from the central axis 34 or inclined at an angle to a radius from the central axis 34.

The cover 32 also includes a generally circular bezel 152 attached along its perimeter to the second end 126 of the side wall 122 of the mounting member 120. The bezel 152 is adapted to be located generally perpendicular to and concentrically about the axis 34. The bezel 152 may be formed from a clear or translucent material such that an indicator of the gage operating mechanism may be viewed through the bezel 152. If desired, the bezel 152 may include an aperture to provide external access to the operating mechanism of the gage, such as for example to zero the indicator of the gage operating mechanism.

The cover 32 also includes an annular collar 158 that extends around and outwardly from the second end 126 of the side wall 122 and the bezel 152. The collar 158 includes a generally circular and annular flange 160 that extends outwardly from the second end 126 of the side wall 122. The flange 160 includes an annular inner surface 162 and a spaced apart annular outer surface 164. The collar 158 also includes an annular sleeve 166 attached to the circular outer end of the flange 160. The sleeve 166 extends along the outer edge of the flange 160 generally concentrically about the central axis of the cover 32. The sleeve 166 extends from the outer end of the flange 160 generally parallel to the side wall 122 to a generally circular tip 167 in a direction generally from the second end 126 toward the first end 124 of the side wall 122. The generally circular tip 167 of the sleeve 166 is located generally coplanar with the top surfaces 138 of the mounting lugs 134. The collar 158 includes a generally annular receptacle 168 located between the sleeve 166 and the side wall 122 and between the flange 160 and the top surfaces 138 of the mounting lugs 134. The receptacle 168 is adapted to receive the rim 44 of the housing 30. The collar 158 includes a generally cylindrical side wall 170 formed by the sleeve 166 and the outer end of the flange 160 that extends from the edge 167 of the sleeve 166 to the outer surface 164 of the flange 160. The length of the side wall 170 in a direction generally parallel to the central axis of the cover 32 is relatively short, such as for example, approximately 0.200 inches. The outer surface of the side wall 170 may include a plurality of gripping members 172, such as for example raised ridges, which may be located around the circumference of the side wall 170.

Figure 3:
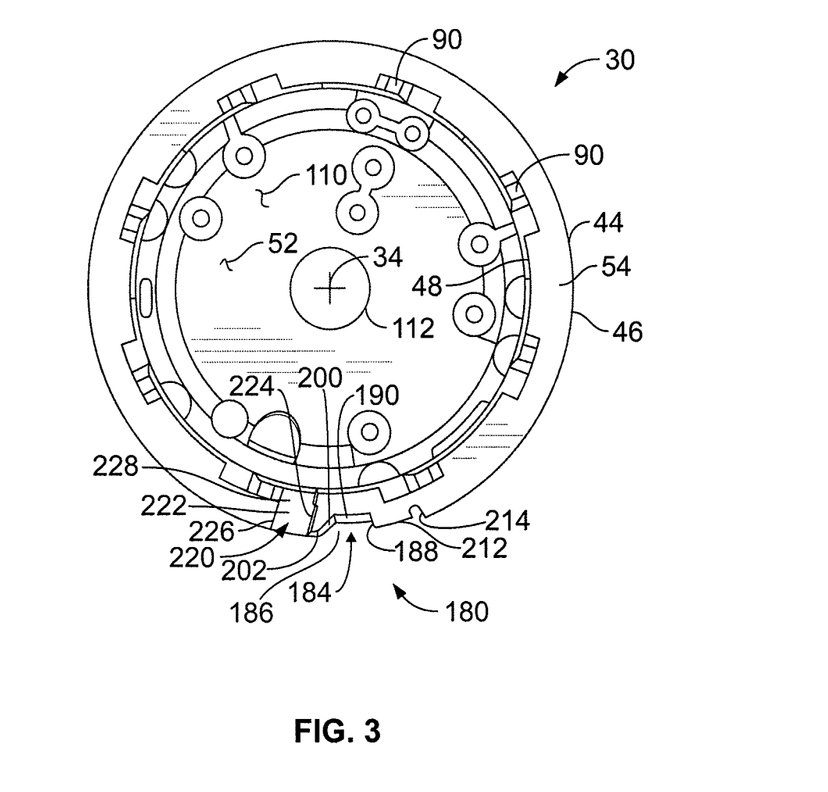
FIG. 3 is a top plan view of the gage housing showing the base lock of the cover retention mechanism.
Figure 4:
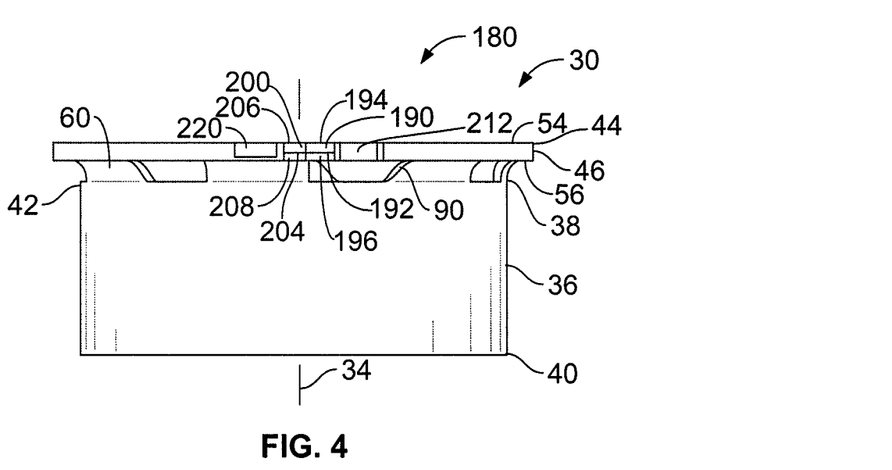
FIG. 4 is a side elevational view of the gage housing showing the base lock of the cover retention mechanism.
Figure 5:
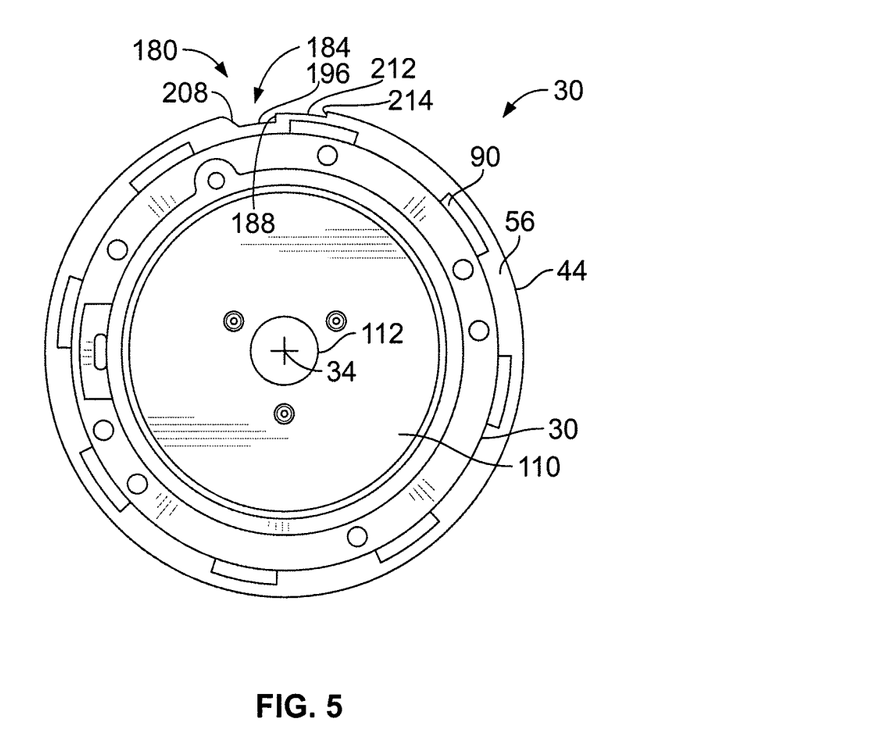
FIG. 5 is a bottom view of the gage housing.

The gage cover retention mechanism 10 includes a base lock 180 and a cover lock 182. The rim 44 of housing 30 includes base lock 180. The base of the cover retention mechanism 10 may comprise the housing 30 or the rim 44 of housing 30. Base lock 180 includes a receiver 184 formed in rim 44. Receiver 184 forms a chamber 186. Receiver 184 includes a generally planar side wall 188 that extends between outer surface 54 and inner surface 56 of the rim 44 and that extends generally radially with respect to central axis 34. Receiver 184 includes an inclined inner wall 190 that extends generally perpendicular to side wall 188 and that includes a first end adjacent an inner end of side wall 188. Inner wall 190 includes a bottom end 192 and a top end 194. Top end 194 of a inner wall 190 is located more closely adjacent to central axis 34 than bottom end 192 is located to central axis 34 such that top end 194 is located inwardly with respect to bottom end 192. Inner wall 190 is thereby vertically inclined with respect to central axis 34. Top end 194 of inner wall 190 is located adjacent outer surface 54 of rim 44. A lower wall 196 is located below inner wall 190 and extends from bottom end 192 of inner wall 190 to the inner surface 56 of rim 44. Lower wall 196 is generally parallel to central axis 34.

Receiver 184 also includes an inclined ramp 200 that extends from a second end of inner wall 190 to an outer tip 202. Ramp 200 comprises an inclined wall having a bottom end 204 and a top end 206. Top end 206 of ramp 200 is located inwardly from bottom end 204 of ramp 200 with respect to axis 34 such that ramp 200 is vertically inclined with respect to central axis 34. Ramp 200 is also inclined with respect to a radius extending transversely outwardly from central axis 34 as ramp 200 extends from a first end adjacent inner wall 190 toward a second end at tip 202. Ramp 200 is thereby inclined in two axes, both horizontally and vertically. Bottom end 192 of inner wall 190 and bottom end 204 of ramp 200 are aligned with one another. Top end 194 of inner wall 190 and top end 206 of ramp 200 are aligned with one another. A lower wall 208 extends downwardly from bottom end 204 of ramp 200 to inner surface 56 of rim 44. Lower walls 196 and 208 are generally perpendicular to inner surface 56 and outer surface 54 of rim 44.

Receiver 184 is formed as a recess in the outer edge 46 of rim 44 and is open at its outer end, its upper end at outer surface 54, and its bottom end at inner surface 56 of rim 44. A recessed wall 212 extends generally perpendicularly between outer surface 54 and inner surface 56 of rim 44 and extends in a generally counter-clockwise direction as shown in FIG. 3 from a first end located adjacent the outer end of side wall 188 of receiver 184 to a second end adjacent a radial wall 214. Recessed wall 212 is located a distance from central axis 34 that is shorter than the distance outer edge 46 of rim 44 is located from central axis 34, such that recessed wall 212 is located inwardly with respect to outer edge 46.

Base lock 180 also includes a receptacle 220 located and formed in rim 44 adjacent receiver 184. Receptacle 220 includes a generally planar bottom wall 222 that extends from outer edge 46 to inner edge 48 of rim 44 and that is located generally parallel to and above inner surface 56 and spaced below a plane containing outer surface 54. Receptacle 220 includes a stop member 224 comprising a wall extending upwardly from bottom wall 222 to outer surface 54 of rim 44 generally perpendicular to outer surface 54 and that extends generally radially with respect to central axis 34. Stop member 224 includes an outer end located adjacent tip 202 of receiver 184. Receptacle 220 also includes a generally planar side wall 226 that extends upwardly from bottom wall 222 to outer surface 54 of rim 44 generally perpendicular to bottom wall 222 and outer surface 54. Side wall 226 is spaced apart from and generally parallel to stop member 224. Receptacle 220 forms a chamber 228 that is open at its outer end at outer edge 46, that is open at its inner end at inner edge 48, and that is open at its top end at outer surface 54.

Cover lock 182 of gage cover retention mechanism 10 is coupled to side wall 170 of cover 32. Cover lock 182 includes a resiliently flexible locking member 240, having a first end 242 and a second end 244. Locking member 240 includes a resiliently flexible arm 246 that extends from first end 242 to second end 244 generally in an arc about axis 34. Arm 246 includes a bottom edge 248 and a spaced apart and generally parallel top edge 250. Top edge 250 is spaced apart from and generally parallel to inner surface 162 of flange 160 of cover 32. Bottom edge 248 of arm 246 is located generally coplanar with tip 167 of side wall 170 of cover 32. Locking member 240 extends from second end 244 at side wall 170 in a cantilevered manner toward first end 242 in a generally counterclockwise direction as viewed in FIG. 6. Arm 246 is generally plate-like and has a thickness between an interior surface and an exterior surface that is relatively small compared to the depth of arm 246 between bottom edge 248 and top edge 250. First end 242 of locking member 240 is spaced apart from an end of side wall 170. The first end 242 of locking member 240 includes a tip 252 and a cavity 254.

Locking member 240 includes a latch 260 at first end 242 located on an interior surface of arm 246. Latch 260 extends inwardly from first end 242 towards the central axis 34 of cover 32. Latch 260 includes an inclined wall or surface 262. Inclined surface 262 extends inwardly as inclined surface 262 extends from a first end at first end 242 toward a second end of inclined surface 262. Inclined surface 262 is adapted to engage inclined ramp 200 of base lock 180. Latch 260 also includes an engagement surface 264 that extends generally radially outwardly with respect to the central axis 34 of cover 32. Latch 260 also includes a side surface 266 that extends between the second end of inclined surface 262 and engagement surface 264. Latch 260 includes a top surface 268 that is generally coplanar with top edge 250 of arm 246 and that is spaced apart from inner surface 162 of flange 160. Latch 260 also includes a bottom surface 270 that is generally parallel to top surface 268 and that is spaced apart inwardly from bottom edge 248 of arm 246.

Latch 260 and first end 242 of locking member 240 are selectively movable between an extended position and a retracted position in a generally radial direction with respect to axis 34. Latch 260 and first end 242 of locking member 240 move radially outwardly away from the central axis of cover 32 when latch 260 and first end 242 of locking member 240 are moved from the retracted position toward the extended position. Cavity 254 is adapted to receive a manually operable implement and tip 252 is adapted to engage the implement, such that the implement can manually move latch 260 and first end 242 of locking member 240 from the retracted position toward the extended position. The implement may be the tip of a fingernail of a user, the tip of a screw driver or similar tool. Arm 246 resiliently biases latch 260 and first end 242 of locking member 240 from the extended position toward the retracted position.

Figure 2:
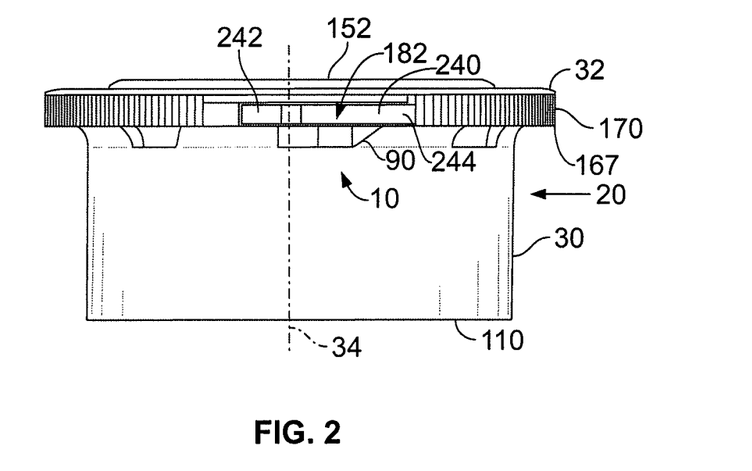
FIG. 2 is a side elevational view of the gage enclosure with the cover retention mechanism locking the gage cover to the gage housing.

When the cover 32 is coupled to the housing 30 in a closed position as shown in FIG. 2, each mounting lug 134 of the cover 32 is located within a respective mounting mechanism 60. The mounting lug 134 extends into the radial slot 70 with the top surface 138 of the mounting lug 134 located closely adjacent the engagement surface 76 of the overhang 74, and the bottom surface 140 of the mounting lug 134 located closely adjacent to the bottom surface 72. The first side wall 144 of the mounting lug 134 is located closely adjacent to the end wall 78 formed by the radial slot 70. The seal member 132 is in sealing engagement with the interior surface of the side wall 36 of the housing 30 thereby creating a seal between the cover 32 and housing 30. Movement of the cover 32 away from the housing 30 in a linear longitudinal direction along the central axis 34 is prevented by engagement of the mounting lugs 134 of the cover 32 with the engagement surfaces 76 of the overhangs 74 of the mounting mechanisms 60 in the housing 30.

When the cover 32 is coupled to the housing 30 in the closed position as shown in FIG. 2, latch 260 of locking member 240 of cover 32 is located within receptacle 220 of base lock 180 such that engagement surface 264 of latch 260 is adapted to engage stop member 224 of receptacle 220 and thereby prevent rotation of cover 32 in a first generally counter-clockwise direction about central axis 34 with respect to housing 30 as viewed in FIG. 3. Latch 260 of locking member 240 of cover lock 182 thereby prevents rotational movement of cover 32 with respect to housing 30 from the closed position to an open position wherein cover 32 may be removed from housing 30. The intergagement of the cover lock 182 with the base lock 180 locks the cover 32 in the closed position with respect to the housing 30.

When it is desired to remove the cover 32 from the housing 30, a user will engage the tip 252 of the locking member 240 and move the latch 260 from the retracted position to the extended position wherein the latch 260 is located outside of the receptacle 220, such that latch 260 is not engagable with stop member 224. The gripping members 172 of the side wall 170 may then be gripped with the fingertips of a user. The cover 32 is rotated about the central axis 34 in the first generally counter-clockwise direction. As the cover 32 rotates in the first rotational direction with respect to the housing 30, the mounting lugs 134 slide from the second end 104 toward the first end 102 of the radial slot 70, generally parallel to the bottom surface 72 and transversely with respect to the central axis 34, until the mounting lugs 134 and cover 32 are located in the open position. When the cover 32 is in the open position, each mounting lug 134 is located adjacent the bottom surface 72, has not yet slid along the ramp 90, and is no longer located between the bottom surface 72 and the engagement surface 76 of the overhang 74, but is instead located beneath the second end 100 of the longitudinal slot 82 in the passageway 106. The user can release the locking member 240 when the cover 32 is in the open position, such that the arm 246 will bias the latch 260 into the receiver 184.

When the cover 32 is in the open position with respect to the housing 30, the cover 32 can be removed from the housing 30 by moving the cover 32 away from the housing 30 in a linear longitudinal direction along the axis 34 such that the mounting lugs 134 pass through the longitudinal slots 82 of the mounting mechanisms 60 along the passageways 106, and the latch 260 passes through the open top of receiver 184. However, when the cover 32 is in the open position, although the overhang 74 of each mounting mechanism 60 does not prevent longitudinal movement of the cover 32, the resilient seal member 32 grips the cover 32 in engagement with the side wall 36 of the housing 30 such that the seal member 132 provides a retention force that must be overcome in order to move the cover 32 along the central longitudinal axis 34 with respect to the housing 30. Due to the relatively short height of the side wall 170 of the cover 32, it is difficult to obtain a sufficient grip on the cover 32 with the fingertips of the user, especially when the housing 30 is mounted with the rim 44 adjacent a mounting panel, to overcome the gripping force provided by the seal member 132 without the use of any tools, such as a screw driver, to pry the cover 32 away from the housing 30 along the axis 34.

When the user is not able to easily overcome the retention force provided by the seal member 32 to remove the cover 32 along the passageway 106 without the use of any tool, the user can continue to rotate the cover 32 with respect to the housing 30 in the first rotational direction from the open position. Such further rotation of the cover 32 with respect to the housing 30 rotates the mounting lugs 134 into engagement with the concavely curved portion of the ramps 90 at the first end 92. Further rotation of the cover 32 with respect to the housing 30 in the first rotational direction slides each mounting lug 134 along the surface of the ramp 90 toward the second end 94 of the ramp 90. As the mounting lugs 134 slide along the inclined ramps 90, the cover 32 simultaneously rotates in the first direction about the central axis 34 and also conjointly moves outwardly away from the housing 30 in a generally linear direction along the central axis 34 while overcoming the retention force provided by the seal member 32 due to the mechanical advantage provided by the inclined ramps 90. Latch 260 rotates along the recessed wall 212 of base lock 180. Continued rotation of the cover 32 in the first rotational direction with respect to the housing 30 rotates the mounting lugs 134 to the convexly curved portion of the ramp 90 at the second end 94 and thereafter to the outer surface 54 of the rim 44 of the housing 30 such that the cover 32 is removed from the housing 30.

The cover 32 may be coupled to the housing 30 in a reverse manner by sliding the mounting lugs 134 downwardly along the inclined ramps 90 by rotation of the cover 32 in a second clock-wise rotational direction about the central axis 34 as viewed in FIG. 3, while also applying a longitudinal force to the cover 32 along the axis 34 to press the cover 32 into engagement with the housing 30. Alternatively, the mounting lugs 134 may initially be moved in a longitudinal direction generally parallel to the central axis 34 along the passageways 106 through the second end 100 of the longitudinal slots 82 until the mounting lugs 134 engage the bottom surfaces 72, whereupon the cover 32 is in the open position with respect to the housing 30. The seal member 132 also inhibits coupling of the cover 32 to the housing 30, but the inhibiting force provided by the seal member 132 can be relatively easily overcome by the user pressing on the cover 32 along the axis 34.

Figure 9:
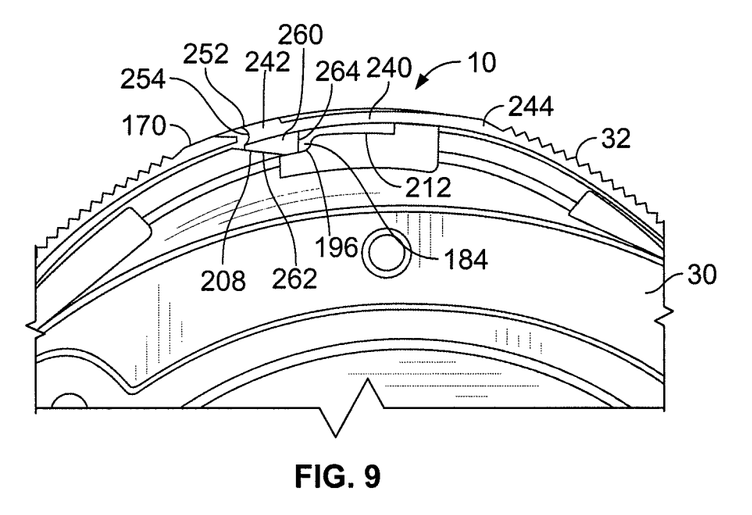
FIG. 9 is a partial bottom view of the gage enclosure with the cover coupled to the housing in an open position with respect to the housing and showing the cover retention mechanism in an unlocked condition.

When the cover 32 is in the open position with respect to the housing 30, as shown in FIG. 9, latch 260 is located within receiver 184 in the retracted position. A user can grip the side wall 170 with fingertips and rotate the cover 32 in the second rotational direction about axis 34 with respect to housing 30 to rotate the mounting lugs 134 in the second end 104 of the radial slot 70 between the bottom surface 72 and the engagement surface 76 of the overhang 74 to place the cover 32 in the closed position. When cover 32 is rotated about axis 34 with respect to housing 30 from the open position as shown in FIG.

Figure 10:
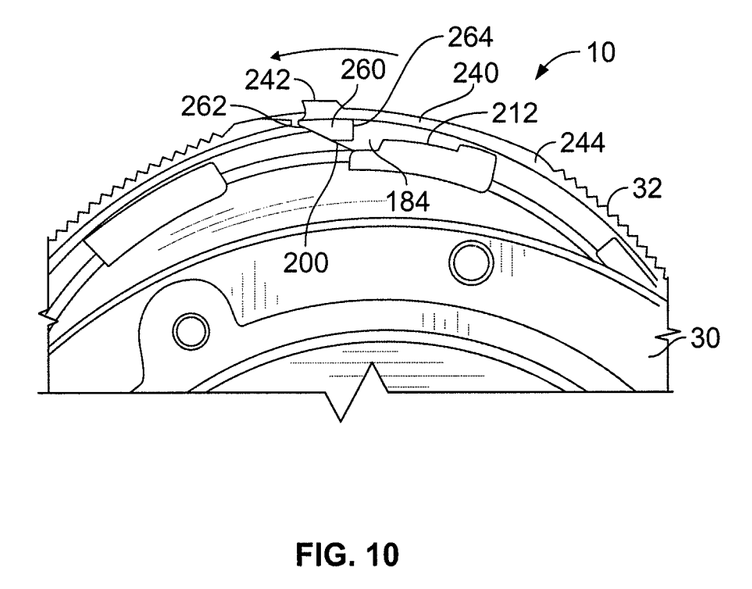
FIG. 10 is a partial bottom view of the gage enclosure with the cover coupled to the housing and rotated in a counter-clockwise direction with respect to the housing from the position as shown in FIG. 9, such that the latch of the cover lock engages the ramp of the receiver of the base lock such that the latch is moved radially outwardly from the central axis of the gage enclosure.

9 toward the closed position as illustrated by the arrow in FIG. 10, inclined surface 262 of latch 260 slidably engages inclined ramp 200 of receiver 184 such that latch 260 is forced radially outwardly towards the extended position as cover 32 is rotated with respect to the housing 30 about axis 34 from the open position toward the closed position.

Figure 11:
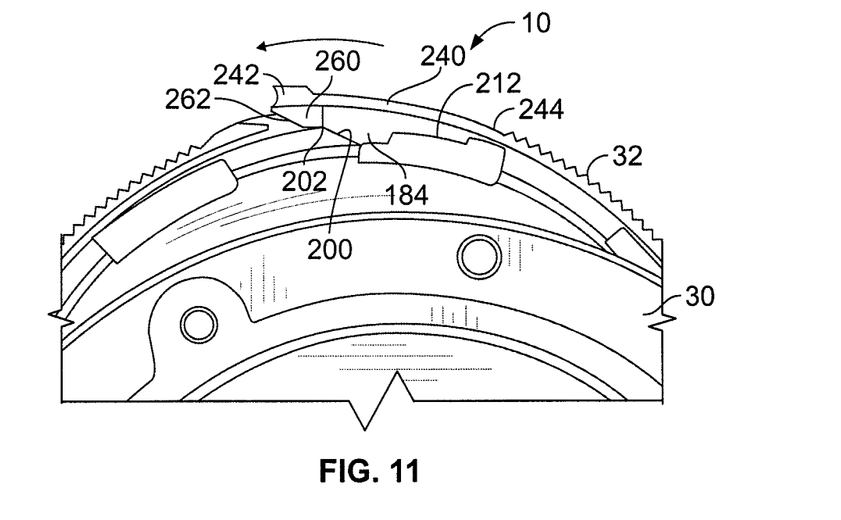
FIG. 11 is a partial bottom view of the gage enclosure showing the cover coupled to the housing and rotated in a counter-clockwise direction with respect to the housing beyond the position shown in FIG. 10 such that the latch of the cover lock engages the tip of the stop member of the receiver of the base lock of the housing whereupon the latch is located radially outwardly further from the central axis of the gage enclosure beyond the position shown in FIG. 10.
Figure 12:
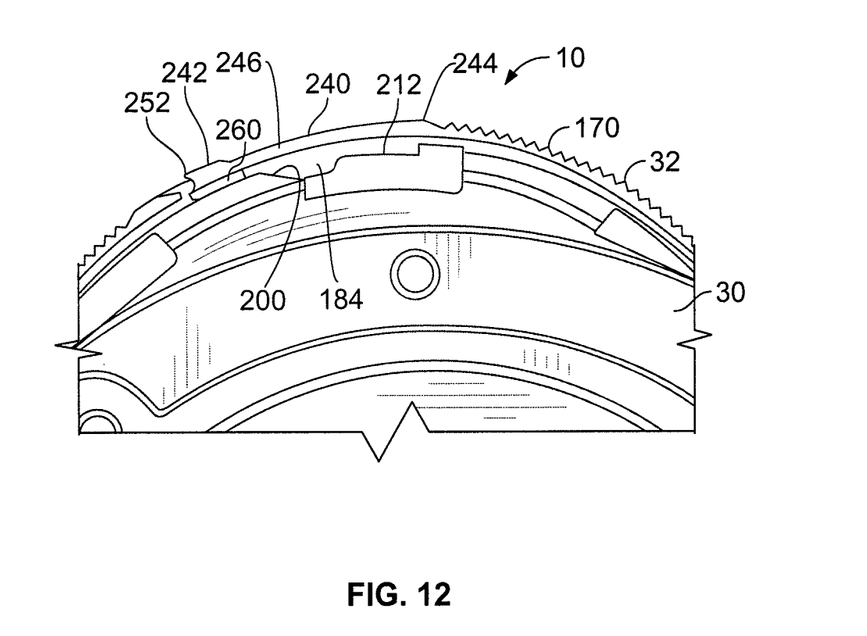
FIG. 12 is a partial bottom view of the gage enclosure with the cover coupled to the housing in the closed position and the locked condition with respect to the housing, wherein the latch of the cover lock is disposed in the receptacle of the base lock such that the latch is adapted to engage the receptacle to prevent rotational movement of the cover with respect to the housing about the central axis of the gage enclosure toward the open position as shown in FIG. 9, such that the cover is locked to the housing.
Figure 13:
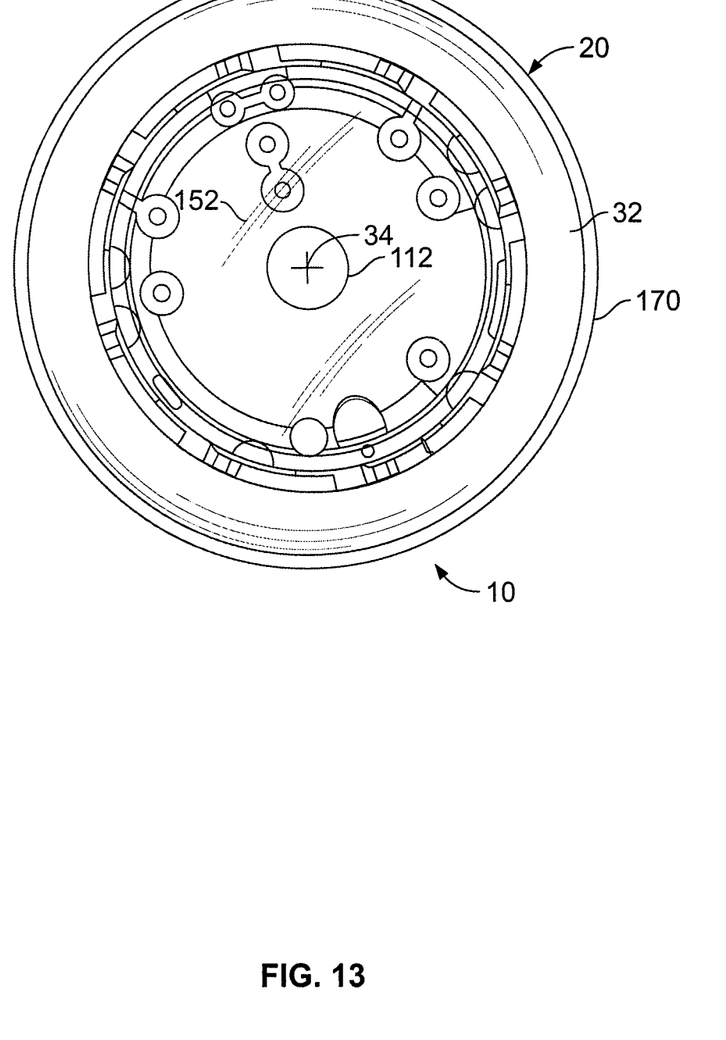
FIG. 13 is a top view of the gage enclosure with the cover coupled to the housing in the closed position and locked condition.

As shown in FIG. 11, as cover 32 continues to be rotated with respect to housing 30 about axis 34 from the open position toward the closed position, latch 260 of locking member 240 will engage tip 202 of receiver 184. Further rotation of cover 32 with respect to housing 30 about central axis 34 will place cover 32 in the closed position with respect to housing 30 as shown in FIG. 12, wherein latch 260 of locking member 240 is located within receptacle 220 such that latch 260 is in the retracted position. Latch 260 is thereby adapted to engage stop member 224 of receptacle 220 to prevent rotation of cover 32 about axis 34 with respect to housing 30 from the closed position toward the open position. Cover 32 is thereby locked to housing 30 in the closed position.

The cover 32 can be attached to and removed from the housing 30 by hand only, and without the use of any tools, due to the mechanical advantage provided by the inclined ramps 90 in overcoming the retention force provided by the seal member. The cover 32 can also be locked to housing 30 in a closed position and can be selectively released from the locked condition by hand only, with manual movement of the locking member 240 and latch 260 from the retracted position toward the extended position.

Various features of the invention have been particularly shown and described in connection with the illustrated embodiment of the invention, however, it must be understood that these particular arrangements merely illustrate, and that the invention is to be given its fullest interpretation within the terms of the appended claims.

The invention claimed is:

1. A cover retention mechanism for selectively locking a cover to a base having a central axis, said cover retention mechanism comprising:
    a base lock having a receptacle coupled to the base and a receiver, said receptacle including a stop member, said receiver forming a chamber, and
    a cover lock coupled to the cover and having a resiliently flexible locking member, said locking member having a first end and a second end, said first end of said locking member being manually movable with respect to said second end of said locking member, said first end of said locking member including a latch adapted to be located in said receptacle of said base lock when said cover is coupled to said base and said cover is located in a closed position with respect to said base, said cover being not removable from said base by movement of said cover with respect to said base along said central axis when said cover is in the closed position, said cover being selectively movable from the closed position to an open position wherein said cover can be removed from said base by movement of said cover with respect to said base along said central axis by rotating said cover with respect to said base about said central axis, said latch of said cover lock adapted to be located within said chamber of said receiver when said cover is in said open position;
    whereby when said latch of said locking member is located in said receptacle said latch is adapted to engage said stop member of said base lock to prevent rotation of said cover with respect to said base about said central axis from the closed position to the open position, and whereby said latch can be manually removed from said receptacle of said base lock whereupon said cover can be rotated with respect to said base about said central axis from the closed position to the open position.

2. The cover retention mechanism of claim 1 wherein said receiver of said base lock includes an inclined ramp extending from a radially inwardly located first end to a radially outwardly located second end, said latch of said cover lock adapted to engage said ramp and to slide along said ramp toward said second end of said ramp when said cover is rotated about said central axis from said open position toward said closed position.

3. The cover retention mechanism of claim 2 wherein said stop member of said receptacle includes a distal tip located adjacent said second end of said ramp of said receiver.

4. The cover retention mechanism of claim 2 wherein said inclined ramp includes an outwardly located bottom end and an inwardly located top end.

5. The cover retention mechanism of claim 2 wherein said receiver includes an inner wall and a side wall, said inner wall extending between said first end of said ramp and said side wall, said inner wall including a radially outwardly located bottom end and a radially inwardly located top end, said side wall including a distal end located adjacent an outer edge of the base.

6. The cover retention mechanism of claim 1 wherein said receptacle includes a bottom wall and a side wall, said bottom wall extending between said stop member and said side wall, said side wall extending between said bottom wall and an outer surface of the base.

7. The cover retention mechanism of claim 1 wherein said receptacle includes an opening formed in an inner edge of said base and an opening formed in an outer edge of said base.

8. The cover retention mechanism of claim 1 wherein said latch of said locking member includes an inclined surface adapted to engage said receiver as said cover is rotated about said central axis with respect to said base toward said closed position, said first end of said locking member being moved radially outwardly away from said central axis as said inclined surface of said latch slides along said receiver as said cover is rotated with respect to said housing.

9. The cover retention mechanism of claim 1 wherein said latch of said locking member includes an engagement surface adapted to engage said stop member of said receptacle when said latch is located in said receptacle and thereby prevent rotation of said cover about said central axis with respect to said base from the closed position to the open position.

10. The cover retention mechanism of claim 1 wherein said locking member includes an elongate arm.

11. The cover retention mechanism of claim 1 wherein said first end of said locking member includes a cavity and a tip, said cavity and said tip adapted to facilitate manual movement of said first end of said locking member from a retracted position to an extended position, said latch being removed from said receptacle when said first end of said locking member is in said extended position.

12. The cover retention mechanism of claim 1 wherein said base comprises a housing having an end wall and a side wall, and a rim attached to said side wall.

13. A cover retention mechanism for selectively locking a cover to a base having a central axis, said cover retention mechanism comprising:
    a base lock having a receptacle coupled to the base and a receiver, said receptacle including a stop member, and
    a cover lock coupled to the cover and including a resiliently flexible biasing member having a first end and a second end and a latch coupled to said first end of said biasing member, said first end of said biasing member being manually movable with respect to said second end of said biasing member such that said latch is movable between a retracted position and an extended position, said biasing member biasing said latch toward said retracted position, said latch adapted to be located in said receptacle of said base lock when said cover is coupled to said base and said latch is in said retracted position; whereby when said latch of said cover lock is located in said receptacle said latch is adapted to engage said base lock to prevent rotation of said cover with respect to said base about said central axis from a closed position toward an open position and thereby prevent removal of said cover from said base, and whereby said latch can be manually removed from said receptacle of said base lock whereupon said cover can be rotated with respect to said base about said central axis from the closed position toward the open position, said latch adapted to be located in said receiver when said cover is located in said open position.

14. The cover retention mechanism of claim 13 wherein said biasing member comprises an elongate arm member.

15. The cover retention mechanism of claim 14 wherein said cover includes a side wall, said arm attached to said side wall.

16. The cover retention mechanism of claim 13 wherein said receptacle of said base lock includes a stop member, said latch of said cover lock adapted to engage said stop member when said latch is located in said receptacle to prevent rotation of said cover with respect to said base about said central axis from a closed position to an open position.

17. A cover retention mechanism for selectively locking a cover to a base, said cover retention mechanism comprising:
a base lock including a receptacle and a receiver, said receiver forming a chamber, and
a cover lock including a resiliently flexible locking member having a first end and a second end, said locking member including a latch at said first end of said locking member, said latch being movable between a retracted position and an extended position, said latch adapted to be located in said receptacle of said base lock when the cover is coupled to the base in a closed position to prevent rotation of the cover with respect to the base from the closed position to an open position, the cover being rotatable with respect to the base when said latch is in the extended position from the closed position to the open position, said latch adapted to be located within said chamber of said receiver of said base lock when the cover is in the open position such that the cover can be removed from the base.

18. The cover retention mechanism of claim 17 wherein said receptacle of said base lock includes a stop member, and said latch of said cover lock includes an engagement surface adapted to engage said stop member when said latch is located in said receptacle, said receiver including an inclined ramp, said latch adapted to engage said ramp when said latch is located in said receiver and the cover is rotated with respect to the base from the open position toward the closed position.

19. A cover retention mechanism for selectively locking a cover to a base having a central axis and a rim having an outer surface, said cover retention mechanism comprising:
a base lock having a receptacle coupled to the base and a receiver, said receptacle including a stop member, said receiver including a chamber having an opening in the outer surface of the rim of the base, and
a cover lock coupled to the cover and having a resiliently flexible locking member, said locking member having a first end and a second end, said first end of said locking member being manually movable with respect to said second end of said locking member, said first end of said locking member including a latch adapted to be located in said receptacle of said base lock when said cover is coupled to said base and said cover is located in a closed position with respect to said base, said cover being not removable from said base by movement of said cover with respect to said base along said central axis when said cover is in the closed position, said cover being selectively movable from the closed position to an open position wherein said cover can be removed from said base by movement of said cover with respect to said base along said central axis by rotating said cover with respect to said base about said central axis, said receiver adapted to receive said latch of said cover lock when said cover is in said open position, said latch of said cover lock adapted to pass through the opening in the outer surface of the rim when said cover is removed from said base by moving said cover with respect to said base along said central axis;
whereby when said latch of said locking member is located in said receptacle said latch is adapted to engage said stop member of said base lock to prevent rotation of said cover with respect to said base about said central axis from the closed position to the open position, and whereby said latch can be manually removed from said receptacle of said base lock whereupon said cover can be rotated with respect to said base about said central axis from the closed position to the open position.

* * * * *